(12) United States Patent
Inage et al.

(10) Patent No.: US 6,662,824 B2
(45) Date of Patent: Dec. 16, 2003

(54) CHECK VALVE SLANTEDLY BIASED AGAINST PRESSURE-IMPOSING DIRECTION

(75) Inventors: Shozo Inage, Anjo (JP); Kaneyoshi Nagatani, Kariya (JP)

(73) Assignee: Denso Corporation, Kariya (JP)

( * ) Notice: Subject to any disclaimer, the term of this patent is extended or adjusted under 35 U.S.C. 154(b) by 66 days.

(21) Appl. No.: 10/024,474

(22) Filed: Dec. 21, 2001

(65) Prior Publication Data

US 2002/0079000 A1 Jun. 27, 2002

(30) Foreign Application Priority Data

Dec. 27, 2000 (JP) .......................................... 2000-398750

(51) Int. Cl.$^7$ ............................................... F16K 15/04
(52) U.S. Cl. ..................................... 137/539.5; 137/535
(58) Field of Search ............................ 137/529, 533.11, 137/533.13, 533.15, 539, 539.5, 535

(56) References Cited

U.S. PATENT DOCUMENTS

| 2,103,673 A | * | 12/1937 | Hoferer .................... 137/539.5 |
|---|---|---|---|
| 2,714,392 A | * | 8/1955 | Mercier .................... 137/539.5 |
| 2,914,085 A | * | 11/1959 | Mercier .................... 137/539.5 |
| 3,437,082 A | * | 4/1969 | Bouwkamp et al. ......... 137/539 |
| 3,465,787 A | * | 9/1969 | Gulick ..................... 137/539.5 |
| 3,742,975 A | * | 7/1973 | Kazama et al. ........... 137/539.5 |
| 4,072,291 A | * | 2/1978 | Adams ....................... 137/539 |
| 4,842,015 A | * | 6/1989 | Haak et al. ................. 137/535 |
| 6,439,263 B2 | * | 8/2002 | Schwegler et al. ....... 137/539.5 |

* cited by examiner

Primary Examiner—John Rivell
(74) Attorney, Agent, or Firm—Posz & Bethards, PLC

(57) ABSTRACT

A check valve allowing one-way fluid flow is disposed at an outlet side of a pressurizing pump. The check valve includes a valve seat and a valve body for opening and closing a fluid passage in response to a fluid pressure supplied to the check valve. The valve body is biased by a biasing member such as a spring in a direction to close the fluid passage. To suppress vibration of the valve body occurring at its open position due to pulsating fluid pressure supplied from the pump, a biasing force is applied to the valve body in a direction slanted from the fluid pressure-imposing direction. The valve body is pushed against a sidewall by a lateral component included in the biasing force, and thereby the vibration of the valve body is suppressed.

13 Claims, 4 Drawing Sheets

CHECK VALVE SLANTEDLY BIASED AGAINST PRESSURE-IMPOSING DIRECTION

CROSS-REFERENCE TO RELATED APPLICATION

This application is based upon and claims benefit of priority of Japanese Patent Application No. 2000-398750 filed on Dec. 27, 2000, the content of which is incorporated herein by reference.

BACKGROUND OF THE INVENTION

1. Field of the Invention

The present invention relates to a check valve that allows one-way fluid flow in a fluid passage, especially to such a check valve for use in an outlet passage of a pump for pressurizing brake fluid therein.

2. Description of Related Art

In a conventional check valve, a ball forming a valve body is biased by a spring toward a valve seat in a direction against a fluid pressure imposed on the valve body, i.e., in a direction for closing the check valve. When the fluid pressure imposed on the ball becomes higher than a biasing force of the spring by a predetermined amount, the ball is separated form the valve seat to open the passage. Upon opening the passage, the ball takes a position where the fluid pressure balances the biasing force of the spring.

When such a check valve is installed in a downstream passage of an outlet port of a pump, the position of the ball in an open state of the check valve is not stably maintained, because the fluid pressure imposed on the ball varies according to the outlet pressure of the pump. In other words, the ball vibrates according to a pulsating pressure of the pump, and the pulsation of the pump pressure is amplified by the vibration of the ball. This has been a problem in the conventional check valve.

SUMMARY OF THE INVENTION

The present invention has been made in view of the above-mentioned problem, and an object of the present invention is to provide an improved check valve in which a vibration of a valve body due to pump pressure pulsation is prevented or suppressed and thereby to avoid an amplification of the pulsating pressure by the check valve.

The check valve according to the present invention is used in a fluid passage such as a bake fluid passage in an anti-lock brake system (ABS) of an automotive vehicle. The check valve is disposed at an outlet port side of a pump that pumps up the brake fluid in wheel cylinders and returns the brake fluid to a master cylinder.

The check valve is integrally formed with an elongate valve casing having a fluid passage therein. A valve seat is positioned in the fluid passage at a middle portion of the valve casing, and a valve body is disposed in contact with the valve seat. The valve body is biased by a biasing member such as a spring or a resilient rubber rod in a direction to push the valve body against the valve seat thereby to close the fluid passage. A fluid pressure is imposed on the valve body in a direction to lift the valve body from the valve seat thereby to open the fluid passage. At the open state, the valve body takes a position balancing the fluid pressure with the biasing force.

Since the fluid pressure supplied from the pump to the check valve is pulsating, the valve body is vibrated by the pulsating pressure. To suppress the valve body vibration, the biasing force is applied to the valve body in a direction slanted from a direction in which the fluid pressure is imposed on the valve body. In other words, the biasing force having a component against the fluid pressure and a lateral component is given to the valve body. On the other hand, a sidewall restricting the lateral movement of the valve body is formed in the valve casing. When the valve body is lifted from the valve seat by the imposed fluid pressure, the valve body is pushed toward the sidewall by the lateral component of the biasing force. Thus, the valve body movement is restricted and its vibration due to the pulsating pressure is suppressed. Preferably, a ceiling wall for restricting a vertical movement of the valve body is formed in the valve casing in addition to the sidewall to further restrict the valve body vibration.

The valve body may be constituted by a ball, and the biasing force may be supplied to the ball via another ball contacting the ball-shaped valve body. In this case, both balls are positioned in the valve casing so that a line connecting centers of both balls lies slantedly from the direction of the fluid pressure imposition to generate the lateral component of the biasing force. It is also preferable to form an outlet port of the fluid passage in a direction of the lateral component of the biasing force, so that the valve body is further pressed to the sidewall by the fluid flow.

The valve casing may be composed of a seat member and a cylindrical sleeve connected to the seat member. In this case, the valve seat is formed at one end of the seat member, and the fluid is introduced from another end. The biasing member and the valve body are contained in the cylindrical sleeve. A rod member having a tapered surface transferring the biasing force to the ball constituting the valve body may be interposed between the spring and the valve body.

According to the present invention, the valve body such as a ball is pushed against the sidewall by the lateral component of the biasing force when the valve takes the open position. Therefore, the vibration of the valve body due to the pulsating pressure is suppressed.

Other objects and features of the present invention will become more readily apparent from a better understanding of the preferred embodiments described below with reference to the following drawings.

DETAILED DESCRIPTION OF THE PREFERRED EMBODIMENTS

Figure 1:
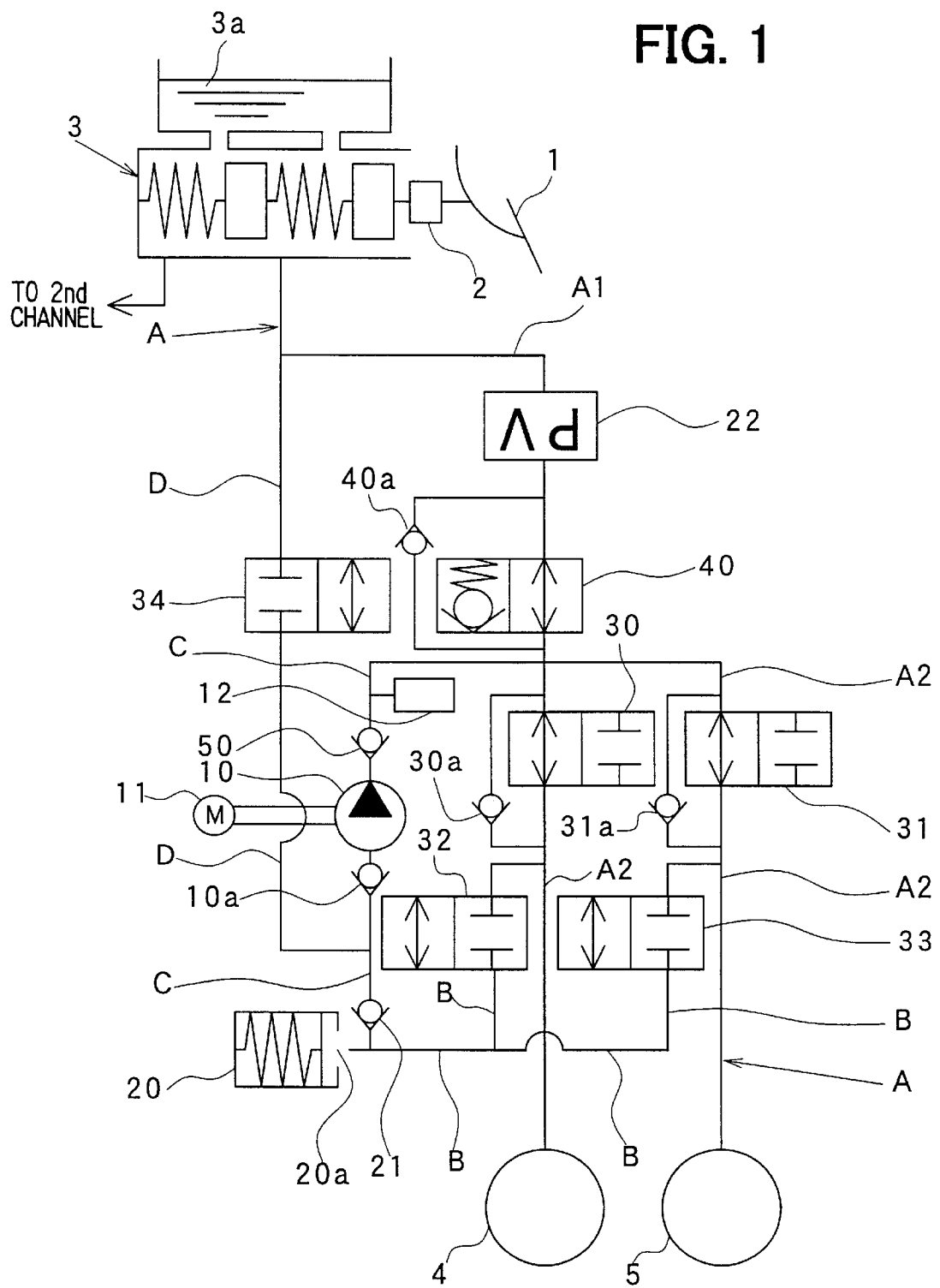
FIG. 1 is a piping structure in an anti-block brake system (ABS) in which a check valve according to the present invention is used.

A first embodiment of the present invention will be described with reference to FIGS. 1–4. First, referring to FIG. 1, an entire structure of an anti-lock brake system (ABS) will be described. In this embodiment, the ABS system is applied to a four wheel vehicle driven by front wheels, and an X-piping is employed in its braking system. That is, a front-right wheel (FR) and a rear-left wheel (RL) are controlled by one braking channel, while a front-left wheel (FL) and a rear-right wheel (RR) are controlled by another braking channel. FIG. 1 shows the one braking channel controlling the FR and the RL. The other braking channel controlling the FL and the RR is structured in the same manner.

As shown in FIG. 1, a brake pedal 1 is connected to a brake booster 2 that boosts a braking force applied to the bake pedal 1. The brake booster 2 is connected to a master cylinder 3 though a push rod. A braking pressure in the master cylinder 3 is generated by pushing a master piston in the master cylinder 3 by the push rod. A master reservoir 3a is connected to the master cylinder 3. The master reservoir 3a supplies brake fluid to the master cylinder 3 and retracts excessive brake fluid from the master cylinder 3. The pressure in the master cylinder 3 is supplied to a wheel cylinder 4 of the front-right wheel (FR) and to a wheel cylinder 5 of the rear-left wheel (RL) through the anti-lock brake system (ABS). The following explanation will be made only with respect to the channel for the FR and RL, because the other channel for the FL and the RR is the same.

A main passage A connected to the master cylinder 3 is divided into a passage Al and an auxiliary passage D. The passage A1 is connected to a proportioning valve 22, and a passage A2 leading to the wheel cylinders 4, 5 is connected to the proportioning valve 22. Generally, the proportioning valve 22 has a function to transfer a pressure attenuated from a base pressure with a predetermined rate to its downstream side when it is connected in a forward direction. In this embodiment, however, the proportioning valve 22 is connected in a reverse direction, as shown in FIG. 1, making its outlet pressure in passage A2 a base pressure.

The passage A2 is divided into two passages. A brake pressure to the wheel cylinder 4 is led through one passage in which a first pressurizing control valve 30 is connected, while a brake pressure to the wheel cylinder 5 is led through another passage in which a second pressurizing control valve 31 is connected. The pressurizing control valves 30, 31 are two-position valves that are controlled to a communicating state or to a shut-off state according to signals from an electronic control unit (ECU) of the ABS. When the pressurizing control valves 30, 31 are in the communicating state, the pressure in the master cylinder 3 or an outlet pressure of a pump 10 is supplied to the wheel cylinders 4, 5, respectively. The pressurizing control valves 30, 31 are always in the communicating state in a normal braking in which an ABS control is not performed. Check valves 30a, 31a are connected in parallel to the pressurizing control valves 30, 31, respectively, in order to return the brake fluid in the wheel cylinders 4, 5 when the ABS control is terminated by releasing the brake pedal 1.

The first pressurizing control valve 30 is connected to a reservoir port 20a of a reservoir 20 through a passage B in which a first depressurizing control valve 32 is connected, while the second pressurizing control valve 31 is connected to the same reservoir port 20a through another passage B in which a second depressurizing control valve 33 is connected.

The depressurizing control valves 32, 33 are controlled to a communication state or a shut-off state according to signals from the ECU of the ABS. The depressurizing control valves 32, 33 are always in the shut-off state in a normal braking in which the ABS control is not performed.

Inlet ports of the pressurizing control valves 30, 31 are connected to the reservoir port 20a of the reservoir 20 through a passage C in which a rotational pump 10 is connected. An inlet check valve 10a is connected to an inlet 10 side of the rotational pump 10, while an outlet check valve 50 is connected to an outlet side of the rotational pump 10. Under the ABS control, the brake fluid in the wheel cylinders 4, 5 is released into the reservoir 20 to decrease the brake pressure in the wheel cylinders 4, 5. On the other hand, the brake fluid in the reservoir 20 is pumped up by the rotational pump 10 and supplied to the passage A2 to increase the brake pressure in the wheel cylinders 4, 5. The check valve 50 is the check valve structured according to the present invention, and it will be described later in detail.

The rotational pump 10 is a gear pump such as a trochoid pump driven by a motor 11. A damper 12 is connected to the outlet side of the rotational pump 10 to alleviate pressure pulsation in the fluid pumped out from the rotational pump 10. The inlet side of the rotational pump 10 is connected to the master cylinder through a passage D in which a control valve 34 is connected. When a traction control (TRC) is performed, the pump 10 pumps up the brake fluid in the passage A1 through the passage D and supplies the pumped up brake fluid to the passage A2. Thus, the pressure in the wheel cylinders 4, 5 is made higher than that in the master cylinder 3, and thereby the braking force is increased. The proportioning valve 22 connected in its reverse direction maintains a pressure difference between the master cylinder 3 and the wheel cylinders 4, 5. A check valve 21 is disposed between a junction connecting the passage D to the passages C and the reservoir port 20a to prevent the brake fluid from flowing in a reverse direction from the passage C to the reservoir 20. In the normal braking, the control valve 34 in the passage D is always brought into its shut-off state.

A control valve 40 connected between the proportioning valve 22 and the pressurizing control valves 30, 31 is a two-position valve which is controllable to its communicating state or to its shut-off state. A check valve 40a is connected in parallel to the control valve 40. The control valve 40 is normally controlled to the communication state, and is brought into the shut-off state only when rapidly increasing the brake fluid pressure in the wheel cylinders 4, 5 under the situation where the master cylinder pressure is lower than a predetermined level, or when performing the TRC control. By shutting off the control valve 40, a pressure difference between the master cylinder 3 and the wheel cylinders 4, 5 is maintained at a predetermined level.

Figure 2:
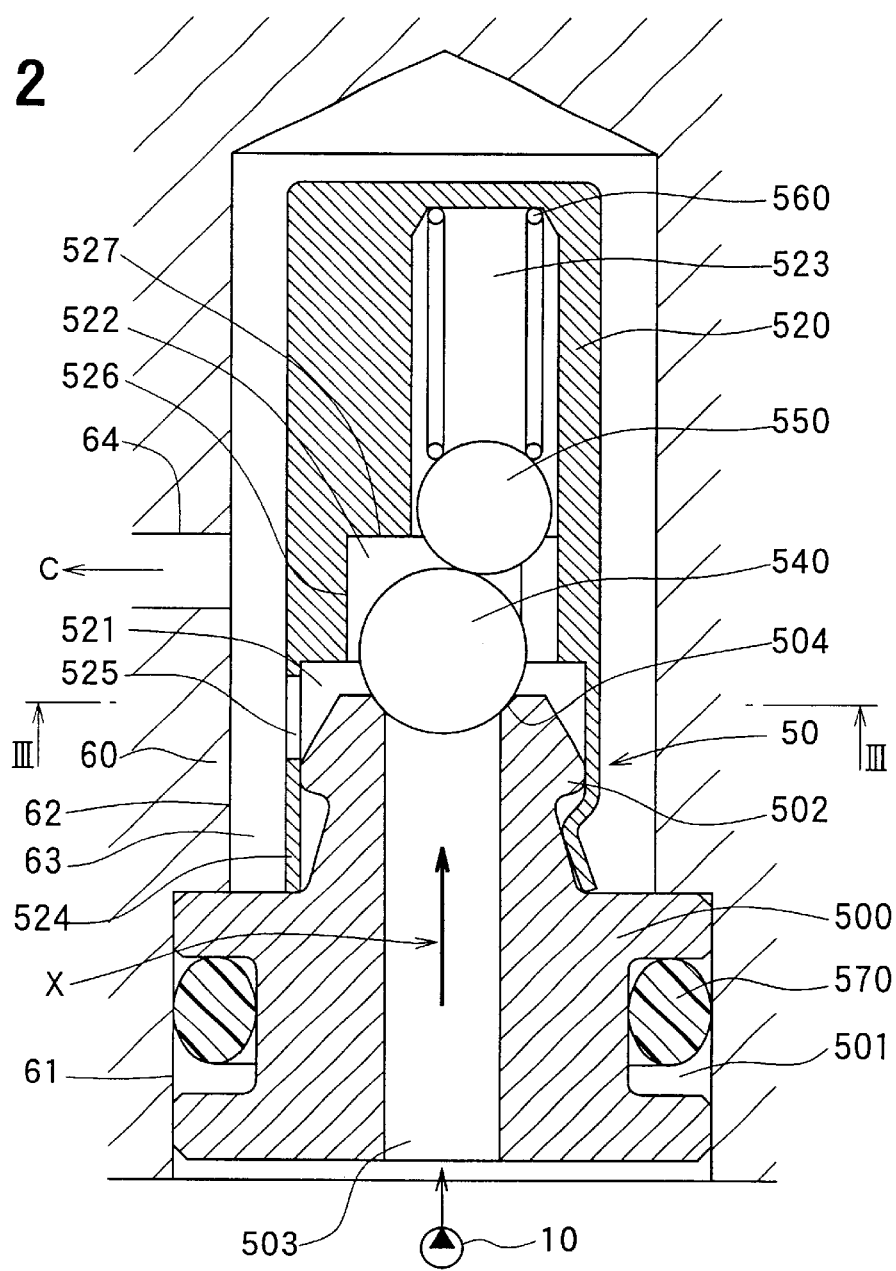
FIG. 2 is a cross-sectional view showing the check valve as a first embodiment of the present invention, the check valve being in a closed state.

Now, the check valve 50 disposed at the outlet side of the rotational pump 10 will be described with reference to FIGS. 2–4. The check valve 50 shown in FIG. 2 is mounted on an ABS casing 60 together with various valves and the rotational pump 10 described above. The check valve 50 is inserted into a stepped hole composed of a hole 61 having a large diameter and a hole 62 having a small diameter. A valve casing of the check valve 50 is composed of a seat member 500 and a sleeve 520 connected to the seat member 500. The seat member 500 is forcibly inserted into the large hole 61 and fixed thereto, and the sleeve 520 is contained in the small hole 62.

A brake fluid passage 63 is formed between the outer periphery of the sleeve 520 and the inner wall of the small hole 62. The brake fluid passage 63 communicates with the passage C (shown in FIG. 1) through a passage port 64 formed in the ABS casing 60. An inlet passage 503 is formed through the center of the seat member 500. The brake fluid pumped up by the rotational pump 10 flows into the check valve 50 through the inlet passage 503 and flows out through the passage 63 and the passage port 64.

As shown in FIG. 2, the check valve 50 is composed of the seat member 500, the sleeve 520, a first ball 540, a second ball 550, a spring 560 and an O-ring 570. All of those components are made of a metallic material except the O-ring 570 which is made of rubber. The seat member 500 is formed in a substantially cylindrical shape having a large diameter base and a small diameter boss. On the outer periphery of the base, a groove 501 in which the O-ring 570 is accommodated is formed. A circular projection 502 is formed around the outer periphery of the boss. On the upper surface of the boss, a valve seat 504 having a tapered surface is formed.

The first ball 540 constituting a valve body is disposed in contact with the valve seat 504. A pressure of the brake fluid introduced from the inlet passage 503 is imposed on the first ball 540 in a direction to lift up the first ball 540. A direction X in which the brake fluid pressure is imposed on the first ball 540 constituting the valve body is referred to as a pressure-imposing direction. The pressure-imposing direction is in parallel to an axial center of the inlet passage 503 and perpendicular to the upper surface of the valve seat 504.

The sleeve 520 is formed in a cylindrical shape with one end closed and includes three cylindrical inner spaces formed therein, i.e., a first inner space 521, a second inner space 522 and a third inner space 523. The first inner space 521 formed coaxially with the center axis of the sleeve 520 serves as a fluid passage through which the brake fluid flows when the first ball 540 is lifted. An outlet port 525 is formed through a cylindrical thin wall 524 of the first inner space 521. The outlet port 525 is formed in a direction of a lateral component F1 of a biasing force of the spring 560 (explained later in detail). The brake fluid flows out into the passage 63 through the outlet port 525.

The second inner space 522 having a smaller diameter than the first inner space 521 is also formed coaxially with the center axis of the sleeve 520. The second inner space 522 includes a sidewall 526 which is parallel to the pressure-imposing direction X and a ceiling wall 527. Lateral and vertical movements of the first ball 540 are restricted by the sidewall 526 and the ceiling wall 527, respectively.

The third inner space 523 having a smaller diameter than the second inner space 522 is formed eccentrically with the center axis of the sleeve 520. The second ball 550 and the spring 560 are disposed in the third inner space 523. The second ball 550 constitutes a member transferring a biasing force of the spring 560 to the first ball 540 and is positioned between the first ball 540 and the spring 560. The spring 560 exerts its biasing force in a direction to push down the first ball 540 thereby to close the check valve. The sleeve 520 is fixedly connected to the seat member 500 by caulking the end portion of its cylindrical thin wall 524 against the circular projection 502 of the seat member 500, after the spring 560, the second ball 550 and the first ball 540 are all contained in the sleeve 520.

Operation of the check valve 50 will be explained below with reference to FIGS. 2, 3 and 4. When the ABS control is performed, the rotational pump 10 is driven thereby to pressurize the brake fluid sucked thereinto. The pressurized brake fluid is introduced into the check valve 50 through the inlet passage 503, and the brake fluid pressure is imposed on the first ball 540 in the pressure-imposing direction X. The first ball 540 moves in a direction to open the valve against the biasing force of the spring 560, as shown in FIG. 4. As the valve opens, the brake fluid flows into the passage C through the inlet port 503, the first inner space 521, the outlet port 525, the passage 63 and the passage port 64.

Since the second ball 550 is contained in the third inner space 523 which is eccentric with the second inner space 522, a line extending from the center of the second ball 550 to the center of the first ball 540 is slanted relative to the pressure-imposing direction X. Therefore, the biasing force F of the spring 560 is applied to the first ball 540 in the direction slanted from the direction X, as shown in FIG. 4. In other words, the biasing force F is composed of a vertical component in the direction X and a lateral component F1 in a direction perpendicular to the direction X.

When the first ball 540 is lifted against the biasing force F, the first ball 540 is pushed toward the sidewall 526 by the lateral component F1, and thereby the first ball 540 contacts the sidewall 526. Therefore, the lateral movement of the first ball is restricted by the sidewall 526, and thereby the vibration of the first ball 540 caused by the pulsating pressure of the brake fluid supplied from the rotational pump 10 is suppressed. Accordingly, amplification of the pressure pulsation by the vibration of the first ball 540 is avoided. As the brake fluid pressure further increases, the first ball 540 is lifted up until it contacts the ceiling wall 527. Under this situation, the first ball 540 is restricted by both the sidewall 526 and the ceiling wall 527, and thereby the vibration of the first ball 540 is surely avoided.

Figure 3:
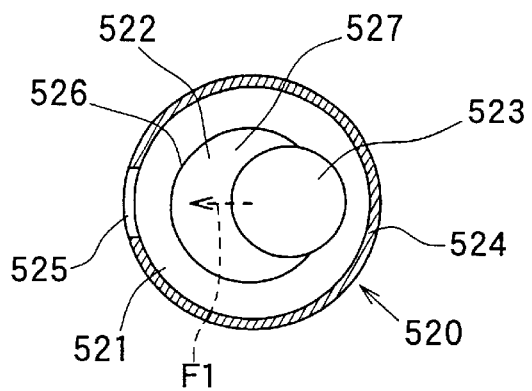
FIG. 3 is a cross-sectional view of a sleeve of the check valve, taken along line III—III in FIG. 2.
Figure 4:
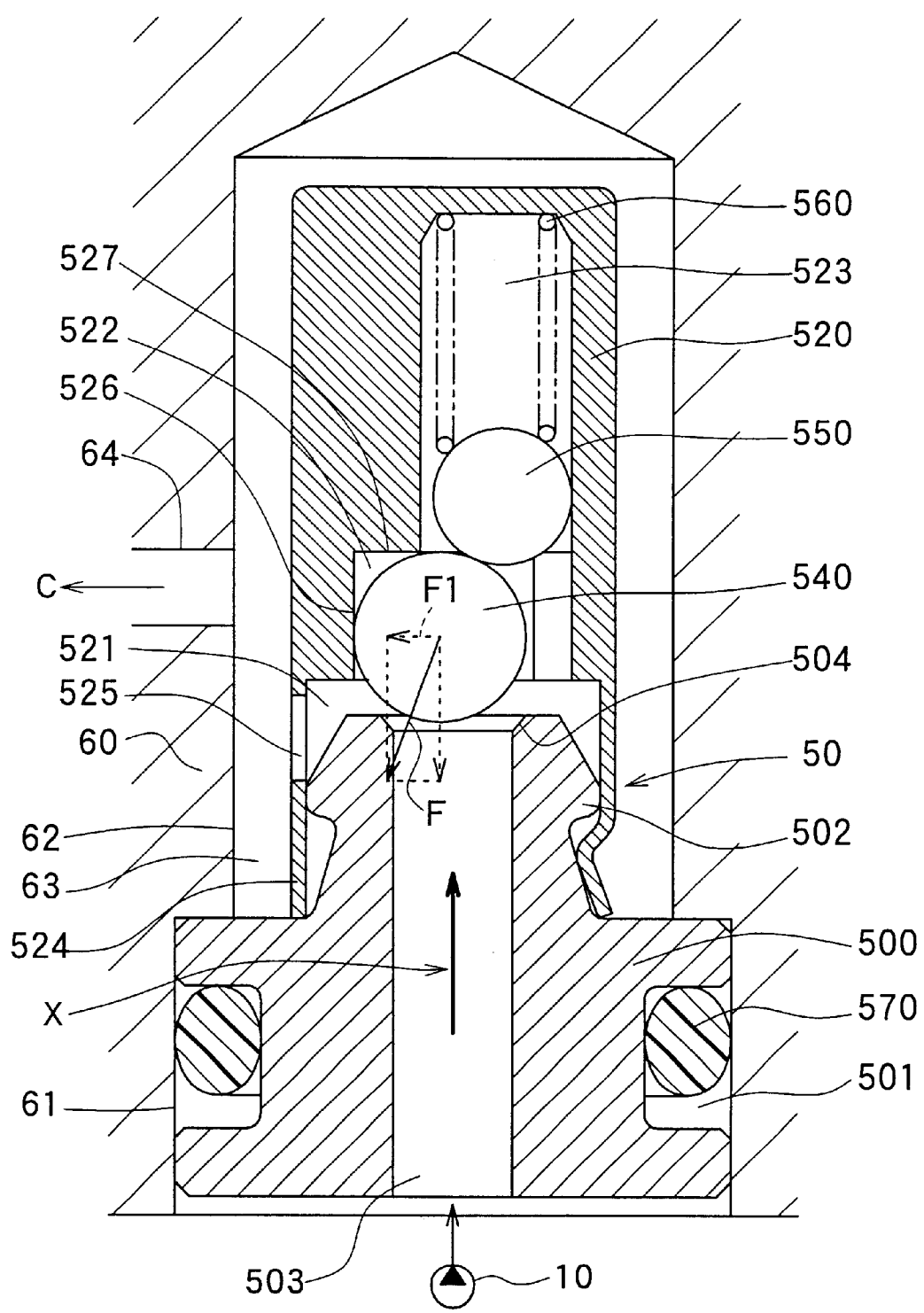
FIG. 4 is a cross-sectional view of the check valve shown in FIG. 2, the check valve being in an open state.

Further, since the outlet port 525 is formed in the direction of the lateral component F1 of the biasing force F, as shown in FIG. 3, a direction of the brake fluid flowing out from the outlet port 525 coincides with the direction of the lateral component F1. Therefore, the first ball 540 is further pushed against the sidewall 526 by the fluid flow, and thereby the vibration of the first ball 540 is further restricted. The outlet port 525 is not necessarily formed in a direction exactly coinciding with the direction of the lateral component F1. The outlet port 525 may be formed within an angular range of plus or minus 90 degrees from the direction of the lateral component F1. However, it is preferable to form it within an angular range of plus or minus 45 degrees.

The check valve 50 described above as the first embodiment may be variously modified. For example, the spring 560 may be replaced with a resilient member such as a rubber rod. The second ball 550 and the spring 560 may be combined into a single resilient member such as a rubber pillar. It is also possible to eliminate the spring 560 and to use the weight of the second ball 560 itself as a source of the biasing force which is applied to the first ball 540 in the direction slanted from the pressure-imposing direction X. Both of the first and second balls 540, 550 may be made in a same size, so that they are easily contained in the sleeve 520 without considering the order of assembling.

Figure 5:
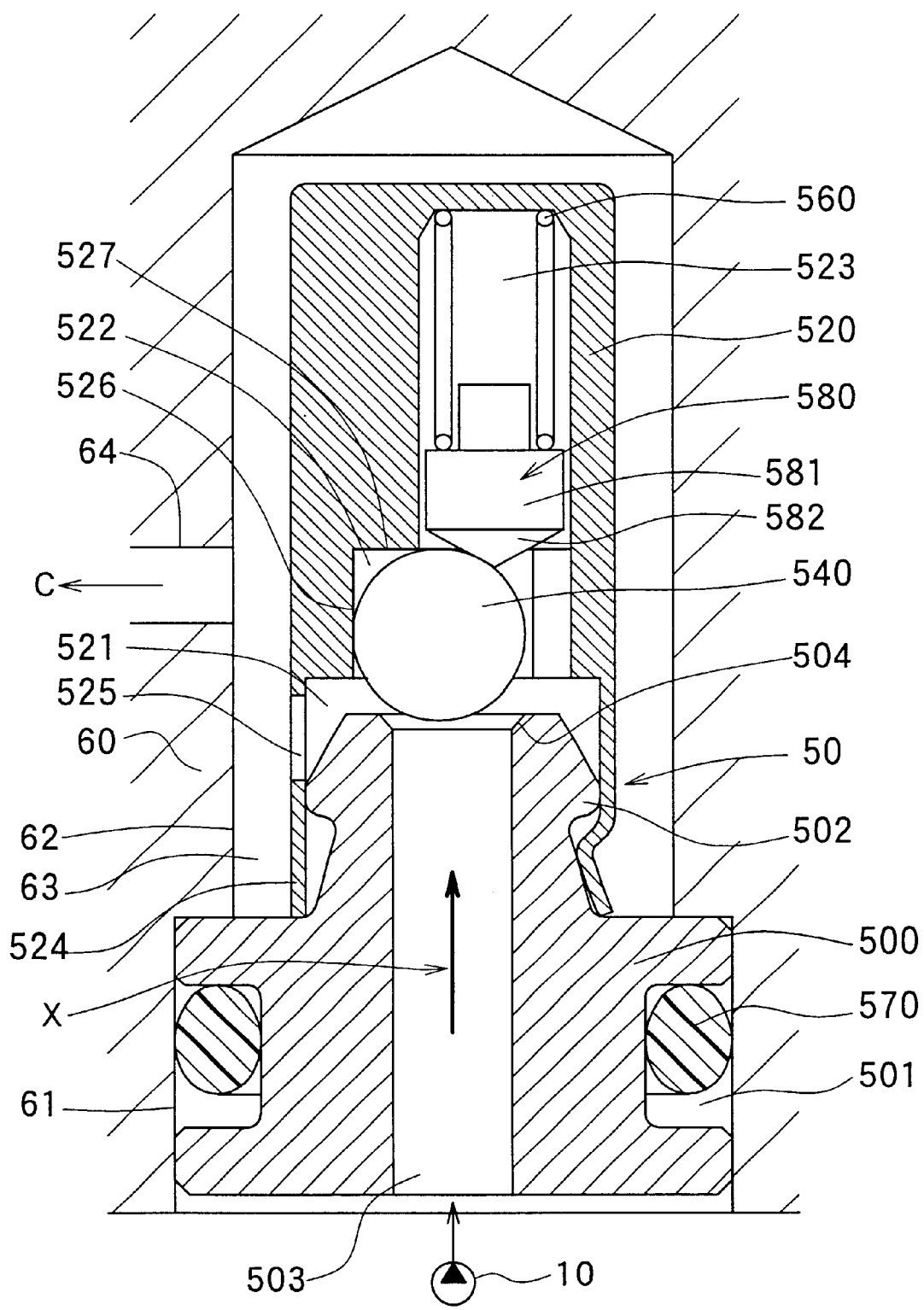
FIG. 5 is a cross-sectional view showing the check valve as a second embodiment of the present invention, the check valve being in an open state.

A second embodiment of the present invention is shown in FIG. 5. In this embodiment, the second ball 550 is replaced with a rod 580, and other structures are the same as those of the first embodiment. FIG. 5 shows the state in which the first ball 540 is lifted to open the valve. The rod 580 includes a cylindrical portion 581 and a tapered surface 582 contacting the first ball 540. The biasing force of the spring 560 is transferred by the rod 580 to the first ball 540. The biasing force is applied to the first ball 540 in the direction slanted from the pressure-imposing direction X in this structure, too. Accordingly, the first ball 540 is pushed against the sidewall 526 by the lateral component F1 of the biasing force in the same manner as in the first embodiment. Thus, the vibration of the first ball 540 due to the pulsating pressure imposed thereon is suppressed.

In the foregoing embodiments, the check valve 50 is used as a check valve connected to the outlet port of the rotational pump 10 in the ABS system. The check valve 50 according to the present invention may be used as a check valve in systems other than the ABS. Especially, the check valve 50 can be advantageously used in fluid channels that include a large amount of pressure pulsation.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A check valve comprising:
a valve casing having a fluid passage formed therein;
a valve seat formed in the fluid passage;
a valve body positioned on the valve seat for opening and closing the fluid passage according to a fluid pressure imposed on the valve body; and
a biasing member contained in the valve casing for biasing the valve body in a direction to close the fluid passage, wherein;
a sidewall for restricting a lateral movement of the valve body is formed downstream of the valve seat; and
the biasing member applies its biasing force to the valve body in a direction slanted from a direction in which the fluid pressure is imposed on the valve body, so that the valve body is pushed to the sidewall by a lateral component of the biasing force and the lateral movement of the valve body is restricted by the sidewall when the valve body opens the fluid passage, wherein:
the biasing member is composed of a spring and a member interposed between the spring and the valve body for transferring a biasing force of the spring to the valve body;
the valve body is a metallic ball; and
the member for transferring the biasing force is a metallic ball contacting the valve body.

2. The check valve as in claim 1, wherein the biasing force transferring member is a rod having a cylindrical portion and a tapered surface connected to the cylindrical portion, the tapered surface being disposed in contact with the ball constituting the valve body, so that the biasing force of the spring is applied to the ball in the direction slanted from the direction of the fluid pressure.

3. The check valve according to claim 1, wherein the check valve is connected to an outlet side of a pump for sucking brake fluid from wheel cylinders and for supplying the sucked brake fluid to a master cylinder in an anti-lock brake system.

4. A check valve comprising:
a valve casing having a fluid passage formed therein;
a valve seat formed in the fluid passage;
a valve body positioned on the valve seat for opening and closing the fluid passage according to a fluid pressure imposed on the valve body; and
a biasing member contained in the valve casing for biasing the valve body in a direction to close the fluid passage, wherein:
a sidewall for restrictin a lateral movement of the valve body is formed downstream of the valve seat; and
the biasing member applies its biasing force to the valve body in a direction slanted from a direction in which the fluid pressure is imposed on the valve body, so that the valve body is pushed to the sidewall by a lateral component of the biasing force and the lateral movement of the valve body is restricted by the sidewall when the valve body opens the fluid passage, wherein:
the biasing member is composed of a spring and a member interposed between the spring and the valve body for transferring a biasing force of the spring to the valve body;
the valve body is a metallic ball; and
the valve casing includes a ceiling wall for restricting movement of the valve body in the direction in which the fluid pressure is imposed thereon.

5. A check valve comprising:
a valve casing having a fluid passage formed therein;
a valve seat formed in the fluid passage;
a valve body positioned on the valve seat for opening and closing the fluid passage according to a fluid pressure imposed on the valve body; and
a biasing member contained in the valve casing for biasing the valve body in a direction to close the fluid passage, wherein:
a sidewall for restricting a lateral movement of the valve body is formed downstream of the valve seat; and
the biasing member applies its biasing force to the valve body in a direction slanted from a direction in which the fluid pressure is imposed on the valve body, so that the valve body is pushed to the sidewall by a lateral component of the biasing force and the lateral movement of the valve body is restricted by the sidewall when the valve body opens the fluid passage, wherein:
the biasing member is composed of a spring and a member interposed between the spring and the valve body for transferring a biasing force of the spring to the valve body; and
the valve casing includes an outlet port of the fluid passage, the outlet port being formed in a direction in which the lateral component of the biasing force is directed.

6. A check valve comprising:
a valve casing having a fluid passage formed therein;
a valve seat formed in the fluid passage;
a valve body positioned on the valve seat for opening and closing the fluid passage according to a fluid pressure imposed on the valve body; and
a biasing member contained in the valve casm for biasing the valve body in a direction to close the fluid passage, wherein:
a sidewall for restricting a lateral movement of the valve body is formed downstream of the valve seat; and
the biasing member applies its biasing force to the valve body in a direction slanted from a direction in which the fluid pressure is imposed on the valve body, so that the valve body is pushed to the sidewall by a lateral component of the biasing force and the lateral movement of the valve body is restricted by the sidewall when the valve body opens the fluid passage, wherein:
the biasing member is composed of a spring and a member interposed between the spring and the valve body for transferring a biasing force of the spring to the valve body;
the valve casing is composed of a seat member disposed at an upstream side of the fluid passage and a sleeve connected to the seat member at a down stream side of the fluid passage;

the valve seat is formed on an upstream end of the seat member; and the sidewall is formed in the sleeve, and the spring and the biasing force transferring member are contained in the sleeve.

7. The check valve as in claim 6, wherein:

the seat member includes an inlet passage formed through an axial center of the seat member, a fluid flowing through the fluid passage being introduced into the check valve from the inlet passage; and the sleeve is formed in a substantially cylindrical shape with one end closed and the other end opened, the sleeve being integrally connected to the seat member by caulking an outer periphery of the open end.

8. The check valve as in claim 7, wherein:

the sleeve includes a first inner space, a second inner space and a third inner space, those spaces being formed in this order from the open end of the sleeve;

the sidewall constitutes a part of a wall surrounding the second inner space; and the spring and the biasing force transferring member are contained in the third inner space.

9. The check valve as in claim 8, wherein the first and the second inner spaces are formed coaxially with the direction in which the fluid pressure is imposed on the valve body, while the third inner space is formed eccentrically with that direction.

10. The check valve as in claim 9, wherein a ceiling wall for restricting movement of the valve body in the direction in which the fluid pressure is imposed on the valve body is formed as a part of a wall surrounding the second inner space.

11. The check valve as in claim 9, wherein:

the first inner space is surrounded by a cylindrical wall; and an outlet port of the fluid passage is formed through the cylindrical wall in a direction in which the lateral component of the biasing, force is directed.

12. A check valve comprising:

a valve casing having a fluid passage formed therein;

a valve seat formed in the fluid passage;

a valve body positioned on the valve seat for opening and closing the fluid passage according to a fluid pressure imposed on the valve body; and a biasing member composed of a resilient member and a biasing force transferring member, the biasing member biasing the valve body in a direction to close the fluid passage, wherein:

a sidewall for restricting a lateral movement of the valve body is formed downstream of the valve seat;

the resilient member exerts a biasing force on the biasing force transferring member in a direction parallel to but eccentric to a direction in which the fluid pressure is imposed on the valve body; and the biasing force transferring member contacts the valve body to transfer the biasing force to the valve body in a direction slanted from the direction in which the biasing force is exerted on the biasing force transferring member, so that the valve body is pushed toward the sidewall by a lateral component of the biasing force, and the lateral movement of the valve body is restricted by the sidewall when the valve body opens the fluid passage.

13. A check valve comprising:

a valve casing having a fluid passage formed therein;

a valve seat formed in the fluid passage;

a valve body positioned on the valve seat for opening and closing the fluid passage according to a fluid pressure imposed on the valve body; and a biasing member composed of a resilient member and a biasing force transferring member, the biasing member biasing the valve body in a direction to close the fluid passage, wherein:

a sidewall for restricting a lateral movement of the valve body is formed downstream of the valve seat;

the resilient member is disposed in a cylindrical inner space of the valve casing, an axial direction of the cylindrical inner space being in parallel to but eccentric to a direction in which the fluid pressure is imposed on the valve body; and the biasing force transferring member contacts the valve body to transfer the biasing force to the valve body in a direction slanted from the axial direction of the cylindrical inner space, so that the valve body is pushed toward the sidewall by a lateral component of the biasing force and the lateral movement of the valve body is restricted by the sidewall when the valve body opens the fluid passage.

* * * * *